United States Patent
Fleischman

(10) Patent No.: US 8,213,431 B2
(45) Date of Patent: Jul. 3, 2012

(54) SYSTEM AND METHOD FOR ENABLING WIRELESS REAL TIME APPLICATIONS OVER A WIDE AREA NETWORK IN HIGH SIGNAL INTERMITTENCE ENVIRONMENTS

(75) Inventor: Eric W. Fleischman, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 1092 days.

(21) Appl. No.: 12/016,616

(22) Filed: Jan. 18, 2008

(65) Prior Publication Data

US 2009/0185513 A1      Jul. 23, 2009

(51) Int. Cl.
*H04L 12/56* (2006.01)
(52) U.S. Cl. ............................................. 370/392
(58) Field of Classification Search ............ None
See application file for complete search history.

(56) References Cited

U.S. PATENT DOCUMENTS

| | | |
|---|---|---|
| 6,907,039 B2 | 6/2005 | Shen |
| 6,990,111 B2 | 1/2006 | Lemoff et al. |
| 7,161,929 B1 | 1/2007 | O'Neill et al. |
| 7,284,162 B2 | 10/2007 | Dragnea et al. |
| 7,286,479 B2 | 10/2007 | Bragg |
| 7,310,685 B2 | 12/2007 | Basso et al. |
| 2003/0137974 A1 | 7/2003 | Kwan et al. |
| 2004/0181740 A1* | 9/2004 | Tomaru et al. ............... 714/776 |
| 2004/0228343 A1 | 11/2004 | Molteni et al. |
| 2005/0041591 A1 | 2/2005 | Duggi et al. |
| 2005/0175009 A1 | 8/2005 | Bauer |
| 2006/0029035 A1 | 2/2006 | Chase et al. |
| 2006/0029074 A2 | 2/2006 | Bauer |
| 2008/0212566 A1* | 9/2008 | Kim et al. ..................... 370/352 |
| 2011/0149838 A1* | 6/2011 | Gallagher et al. ............ 370/328 |

FOREIGN PATENT DOCUMENTS

WO    WO 01/06732    1/2001

* cited by examiner

*Primary Examiner* — Anh-Vu H Ly
*Assistant Examiner* — Tito Pham
(74) *Attorney, Agent, or Firm* — Harness, Dickey & Pierce, P.L.C.

(57) ABSTRACT

A system and method for communicating real time information using a wide area network protocol and communications protocol that mitigates against potentially significant packet loss rates caused by events such as signal blockage occurring at the underlying wireless transmission (e.g., radio) links. In one implementation the method involves creating a first data packet having a first segment of information, and a first identification (ID) code. The first data packet is then transmitted. A second data packet is then created having information forming the first data packet and also a second segment of information identified by a second code. The second packet is then transmitted. Subsequently formed data packets may include all of the information from previously created data packets until a maximum packet depth is reached, and then each subsequently created new data packet drops off the oldest packet information from the previously created packet while including new information.

16 Claims, 4 Drawing Sheets

FIG 5

| ID n   | RECORDING n   | CRC n   | — 26a |
|--------|---------------|---------|-------|
| ID n+1 | RECORDING n+1 | CRC n+1 | — 26b |
| ID n+2 | RECORDING n+2 | CRC n+2 | — 26c |
| ID n+3 | RECORDING n+3 | CRC n+3 | — 26d |
|        |               |         | — 26e |

| ID n   | RECORDING n   | CRC n   | — 28a |
|--------|---------------|---------|-------|
| ID n+1 | RECORDING n+1 | CRC n+1 | — 28b |
| ID n+2 | RECORDING n+2 | CRC n+2 | — 28c |
| ID n+3 | RECORDING n+3 | CRC n+3 | — 28d |
| ID n+4 | RECORDING n+4 | CRC n+4 | — 28e |

| ID n+1 | RECORDING n+1 | CRC n+1 | — 30a |
|--------|---------------|---------|-------|
| ID n+2 | RECORDING n+2 | CRC n+2 | — 30b |
| ID n+3 | RECORDING n+3 | CRC n+3 | — 30c |
| ID n+4 | RECORDING n+4 | CRC n+4 | — 30d |
| ID n+5 | RECORDING n+5 | CRC n+5 | — 30e |

30

SYSTEM AND METHOD FOR ENABLING WIRELESS REAL TIME APPLICATIONS OVER A WIDE AREA NETWORK IN HIGH SIGNAL INTERMITTENCE ENVIRONMENTS

STATEMENT OF GOVERNMENT RIGHTS

This invention was made with Government support under DAAB07-02-C-C403 awarded by the Army. The government has certain rights in this invention.

FIELD

The present disclosure relates to systems and methods for wirelessly transmitting real time information, and more particularly to systems and methods for wirelessly transmitting real time multimedia (e.g., voice, video) information over a wide area network in environments where high signal intermittence is encountered, by mitigating the packet data loss often encountered in such environments.

BACKGROUND

The statements in this section merely provide background information related to the present disclosure and may not constitute prior art.

Interest in the use of multi-hop, voice over Internet protocol (VoIP) communications is gaining popularity as a means for conveying real time speech communications over the Internet between two or more users at geographically diverse locations. Although this description and disclosure explicitly references VoIP communications, it is equally applicable to other real time communication uses including video, chat, and alerts or alarms of various types. Many real time protocol systems (i.e., voice, video) regularly transmit chunks of encoded voice or video data at specific time intervals. This encoded data is physically conveyed across the network within network packets. This is traditionally accomplished by using a data communications protocol stack that uses the Internet Protocol (IP) at the network layer and the User Datagram Protocol (UDP) at the transport layer. Voice and video transmissions usually also use the Real Time Protocol (RTP) at the application layer. This combination of IP, UDP, and (optionally) RTP to convey human speech in a telephony-like manner is traditionally called VoIP. Current VoIP techniques require high availability network transports that ensure that the transmitted packets are reliably delivered to their destination(s). The latency and jitter-mitigation requirements of voice and video applications are achieved by implementing traditional quality of service (QoS) techniques. Networks supporting VoIP therefore either use wired media or else wireless media that have been carefully engineered to ensure high network availability (e.g., microwave).

By contrast, high network availability may not exist in first responder (e.g., fire, ambulance, police) and tactical military environments (e.g., warfare environments). Reliable multi-hop VoIP traffic is often difficult to achieve in these environments because their communications rely upon highly dynamic, self-forming networks that are built upon radio systems (potentially including satellite) in order to support extensive mobility within arbitrarily difficult physical deployment environments and conditions. These environments cannot guarantee packet delivery. While the maturing mobile ad hoc network (MANET) protocol techniques address many mobility affects of tactical deployments, they cannot address the possibility of potentially significant wireless signal intermittence and loss between the networked radios and the corresponding packet loss that occurs during signal disruptions. Signal intermittence events are particularly prevalent for communications being transmitted or received while travelling in a mobile platform (including dismounted soldiers) or in actively hostile environments.

Because current VoIP protocols and techniques don't consider the possibility of extensive packet loss within the communications path itself, these protocols do not currently have any mechanism to compensate or mitigate against the potentially significant packet loss that occurs during signal blockage events. VoIP protocols are therefore susceptible to unreliable operation in topologically challenging environments such as environments having significant foliage (e.g., forests that block radio signals), urban deployments (buildings that block signals) or significant landscape topographies (mountains or canyons that block signals). Signal blockage also can occur within environments having heavy particulate matter (e.g., dust storms) and whenever the pitch, roll, or yaw of a mobile vehicle (or dismounted soldier) blocks the signal reception or transmission capabilities of its antenna(s). Large transmission distances can also cause signal attenuation and loss. These environmental factors can be especially problematic in combat settings, and they may cause VoIP communications to fail outright in multi-hop network settings. Nevertheless, the U.S. military has firm requirements that necessitate that reliable multi-hop VoIP must occur. Reliable multi-hop VoIP would also be desirable in non-military applications such as first responders.

Present day solutions to obtaining reliable multi-hop VoIP rely on Quality of Service (QoS) at the data link, network, and/or application layers. QoS techniques have been demonstrated to positively enhance the internal packet queuing and packet drop disciplines of IP devices and to ensure prioritized packet delivery. These techniques offer expedited packet flows. These enhancements are very effective when used in highly available wired network environments and therefore are a important contributing factor for all successful VoIP deployments. Successful VoIP implementations are therefore reliant upon effective QoS configurations.

Unfortunately, the benefits obtained from QoS enhancements often pale in the face of packets lost due to signal intermittence and mobility affects that occur in tactical military (or other types of MANET networks) deployments, which may significantly diminish the value of these QoS enhancements to the user. Specifically, the gains accomplished by QoS within each forwarding hop (i.e., packet forwarding device) operate at millisecond granularities while signal intermittence events, which are due to signal blockages in the underlying wireless data transmission path, may range from truly transient intermittent events to indeterminately long outages (e.g., seconds, minutes, or even longer). A single signal loss event, therefore, can introduce unacceptably large data loss and jitter into the real time voice (or other real time media) session which QoS techniques cannot mitigate. Indeed, QoS is not designed to be able to compensate for wireless signal intermittence and loss, nor are the VoIP protocols themselves designed to withstand such packet losses. Furthermore, because the timeframes of signal disruptions may be arbitrarily large, and certainly could exceed the cumulative benefit of QoS queuing disciplines, the current VoIP approach of using telephony data conversion devices (i.e., CODECS) that regularly transmit small voice encodings is inherently vulnerable to signal disruptions in MANET environments. Indeed, there is not much that can be done at the subnetwork or IP layers to ensure that these regular transmissions are protected from signal loss within highly mobile environments or in topologically challenging environments.

SUMMARY

The present disclosure relates a system and method for redundantly transmitting real time information within multiple data packets in order to minimize the affects caused by data packets becoming lost by events such as wireless signal intermittence.

In one implementation a method is disclosed that involves creating a first data packet having a first segment of information, and a first identification (ID) code. The first data packet is transmitted. A second data packet is then created that includes information forming the first data packet and also a second segment of information identified by a second ID code. The second data packet is then transmitted. Thus, the second data packet also includes the information that formed the first data packet. Subsequently created data packets may include the information of previously created data packets until a predefined maximum packet depth, D, is reached, at which time each subsequently created data packet will have the oldest packet information from the previous data packet omitted, while including new information.

In one implementation the wide area network protocol may comprise a voice over Internet protocol (VoIP). In various implementations the real time segments of information may comprise audio information, and in some implementations voice information. In other implementations the real time segments may comprise segments of real time video information. In yet other implementations it may comprise real time chat information and in another implementation it may comprise alarms or alerts or other real time data.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIGS. 2 through 7 illustrate the contents of five sequentially created data packets (i.e., packets 1-5) created using the methodology of the present disclosure.

DETAILED DESCRIPTION

The following description is merely exemplary in nature and is not intended to limit the present disclosure, application, or uses.

Overview

The system and method of the present disclosure enables real time protocols to be able to specify how many packets will redundantly convey the same data segment content. By so doing it identifies the radio signal intermittence duration that will be mitigated against in that implementation. Since both voice and video real time transmissions usually occur at predefined time intervals, this approach ensures that signal intermittence events of up to R*(D−1) seconds will be transparent (i.e., mitigated) to the recipients, where R is the expected transmission rate (in seconds) of the digital multimedia encoding (e.g., the normal multimedia (e.g., VoIP, video) transmission rates for that media stream—this rate is itself usually a function of the specific CODEC being used to digitally encode that multimedia data) and "D" is the number of different successive packets that will redundantly convey that same data. The value of D also determines the number of distinct multimedia encodings (from that same multimedia data stream) that will be conveyed within a data packet. In order to satisfy the latency and jitter requirements of voice and/or video transmissions, the approach permits packets to carry less than D distinct multimedia encodings for cases in which the conveyed multimedia stream is beginning or ending. In this manner, multimedia data is being transmitted at the same data rates that would otherwise be supported for that same CODEC in traditional VoIP or other multimedia implementations.

Because redundant multimedia segments are transmitted in multiple packets, the various embodiments of the present disclosure preferably also includes the requirement that each transmitted data segment instance within the packet must be associated with a unique identifier to assist the recipient to identify redundant data segments and discern the proper order in which they should be decoded or presented. This system and method of the present disclosure does not specify what type of identifier should be used, only that each identifier instance should be unique and unambiguous. The identifier can be a timestamp, a sequence number, or any other unique identifier system.

The present disclosure also assumes that other information can also optionally accompany each data segment instance within the packet. For example, transmitting Cyclic Redundancy Check (CRC) information is optionally used in some multimedia streaming implementations (e.g., Microsoft's NetShow™) to ensure that received multimedia data that has become corrupted in transit can be identified and reconstituted to its original form by the receiver.

Figure 1:
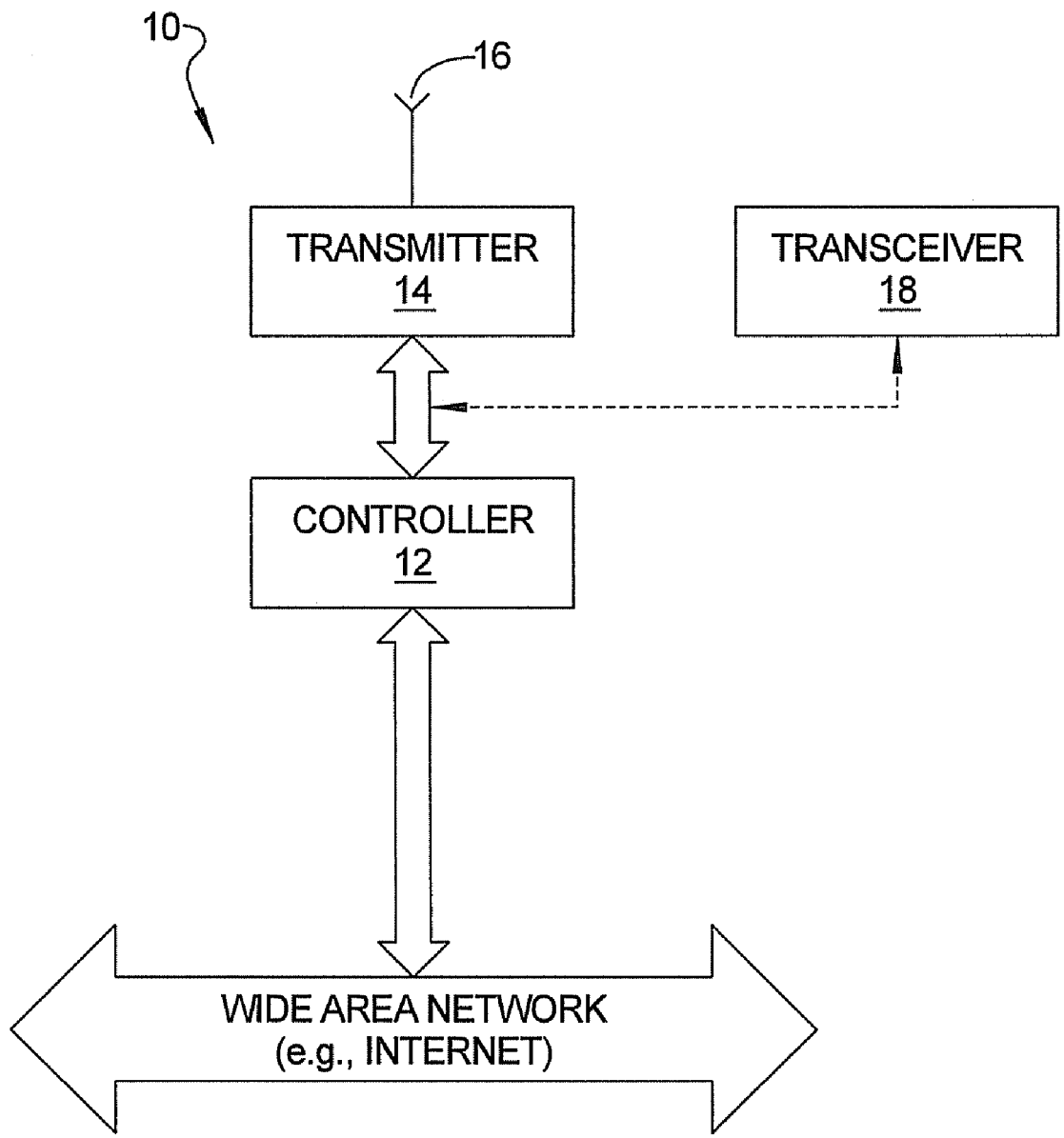
FIG. 1 is a high level block diagram of one embodiment of a system in accordance with the present disclosure.

Referring now to FIG. 1, there is shown a system 10 in accordance with an embodiment of the present disclosure. The system 10 may include a controller 12, a transmitter 14 and an antenna 16. Alternatively, if bidirectional communications are desired, a transceiver 18 may be substituted for the transmitter 14. The controller may be in communication with a wide area network, for example the Internet. The controller 12 prepares data packets of information that are sent to the transmitter 14, which are then transmitted in wireless form via the antenna 16 to remotely located receivers. As explained above, the remotely located receivers may be in topologically challenged locations where signal intermittence may be expected. The signal intermittence may cause an unacceptable loss of packet data to the remote receiver. The system 10 and method of the present disclosure, through its data packet forming methodology, ensures that a sufficient degree of data packet redundancy exists to overcome the signal intermittence problem.

The data packets form real time segments of information that are transmitted in accordance with a wide area network communications protocol, for example a voice over Internet protocol (VoIP). Merely for convenience, the following discussion will center on the system and method of the present disclosure being implemented with a VoIP methodology.

Figure 2:
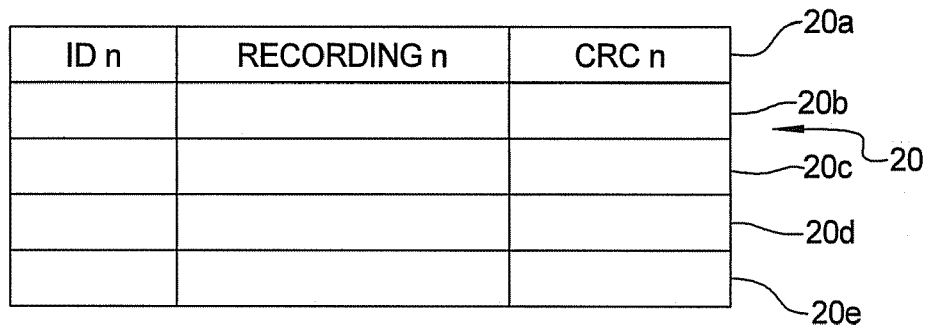

Referring to FIG. 2, the method of the present disclosure initially involves using the controller 12 to initially generate a first data packet 20 for a specific VoIP data stream. In this example the data packets shown in FIGS. 2-6 have a maximum packet "depth" of five packets, meaning that each data packet may include a maximum of five separate segments of voice information. In FIG. 2, packet 20 is the first data packet created for that VoIP data stream and includes a first field 20a having an initial segment of a voice (i.e., speech) recording "Recording n". Recording n has a first identification code "ID n" associated with it, and optionally contains a first cyclic redundancy check "CRC n" created as a check for bit errors to ensure the integrity of the information that forms both the first ID n and Recording n. The first packet 20 has room for four additional fields of information 20b, 20c, 20d and 20e, but these fields are empty at this point. Once created, the first data packet 20 may be transmitted using the transmitter 14 and the antenna 16. Including only the voice segment information pertaining to Recording n, ID n and CRC n in the first data packet 20 ensures that the delay to the recipient(s) is minimized.

Figure 3:
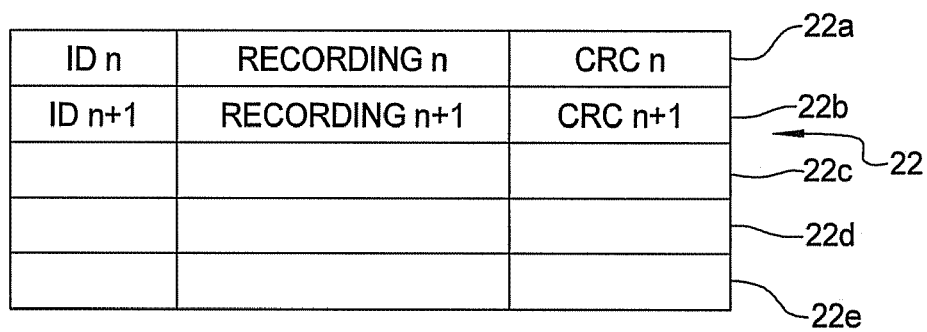

The next data packet 22 created is shown in FIG. 3. Data packet 22 includes the voice information from the first data packet 20 in field 22a, and also includes new voice information in field 22b in the form of a new (i.e., subsequent) segment of the voice recording "Recording n+1", a new ID code "ID n+1" associated with Recording n+1, and optionally a new CRC number "CRC n+1". New CRC number CRC n+1 is a check for bit errors to ensure the integrity of both the Recording n+1 and ID n+1 information. Fields 22c, 22d and 22e remain empty. The second data packet 22 may then be transmitted to the recipient (s).

Figure 4:
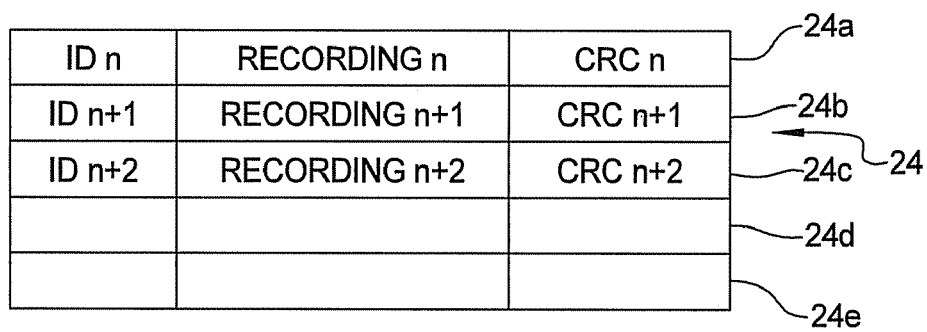

A third data packet 24 is subsequently created as shown in FIG. 4. The third data packet 24 includes the information from the first and second data packets 20 and 22 in fields 24a and 24b, respectively, and also includes a new (i.e., subsequent) voice recording segment Recording n+2, new ID n+2, and optionally a new CRC n+2 associated with Recording n+2 and ID n+2 in field 24c. The fields 26d and 26e remain unused at this point. The third data packet 24 is then transmitted to the recipient(s).

Referring to FIGS. 5 and 6, fourth and fifth data packets 26 and 28 are created using new sequential segments of the voice recording. Packet 26 has one unused field (field 26e), while packet 28 is completely full (i.e., all of fields 28a-28e used). Again, it will be appreciated that a packet depth of five is illustrated merely as one example of how the present methodology may be implemented. Packet depths of greater or less than five may be implemented to suit specific applications or mission requirements.

In FIG. 7, the next data packet 30 is created by dropping (i.e., omitting) the oldest data from previously constructed data packet 28, which is the data that occupied field 28a in data packet 28, and including a new (i.e., subsequent) voice recording segment in field 30e of packet 30. Each subsequently created packet follows this pattern of dropping the oldest information from the previously transmitted packet to make room for the new voice recording segment and its associated ID code and CRC number.

Figure 8:
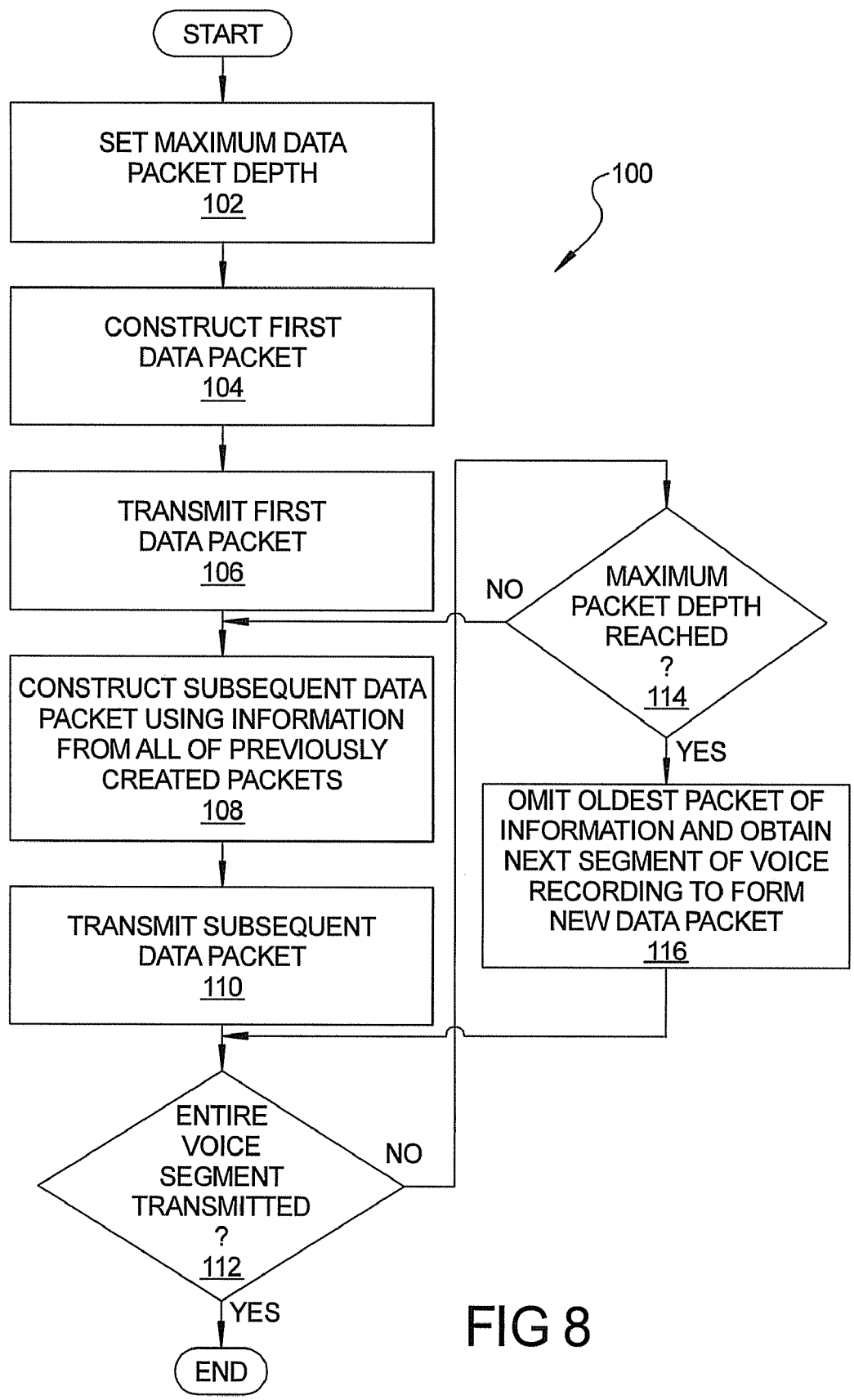
FIG. 8 is a high level flowchart summarizing a plurality of operations of the system of FIG. 1 in creating the data packets shown in FIGS. 2-7.

Referring to FIG. 8, a high level flowchart 100 is shown to further illustrate the methodology of the present application. At operation 102 a maximum packet depth is defined. This occurs when the real time application (e.g., VoIP) is initially configured, previous to initial usage. At operation 104 a first data packet is constructed containing only the information pertaining to a first segment of recorded speech, a first ID code and optionally a first CRC value. At operation 106, the first data packet is transmitted. At operation 108 a subsequent data packet is constructed using the information from the first data packet and a subsequent (i.e., second) segment of recorded speech, an associated ID code and CRC number. The subsequent data packet is then transmitted at operation 110.

At operation 112, a check is then made to determine if the entire voice segment has been transmitted. If this answer is "No", then a check is made at operation 114 to determine if the maximum packet depth has been achieved. If the check at operation 114 is "No", then all of the information from the previously created data packet is used together with new information to create the next new data packet, as indicated at operation 108. If the check at operation 114 indicates a "Yes" answer, then the next new data packet is created by dropping the oldest voice recording segment and its associated data and obtaining the next segment of recorded speech, and its related ID code and CRC number, as indicated at operation 116. A check is then made after operations 112 and 116 to determine if the entire voice recording has been converted and transmitted and, if so, the transmission is complete after the last data segment information has been redundantly transmitted the required number of times. If not, operations 108, 110 and 112 are repeated.

The present system 10 and method minimizes latencies experienced by the recipient when receiving data VoIP transmitted packets, while ensuring that signal intermittence caused by topologic factors (buildings, mountains, etc.) does not adversely affect the reception of data packets using a VoIP communications scheme. A real time voice recording or real time video data may be encoded and transmitted using the system and methodology of the present disclosure. The recipient of real time data uses the ID information contained within each packet to identify redundant data and the proper ordering of the received data. In this way, the recipient ensures that redundant data transmissions are decoded or presented only once in the proper order.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for communicating real time information over a wide area network in accordance with a protocol, the method comprising:

defining a maximum packet field depth that limits a number of data packets that may be transmitted as a single packet string of data packets in a single data transmission operation;

creating a first data packet having a first segment of information, and a first identification (ID) code, and placing the first data packet in a first field of a first packet string;

transmitting said first packet string in a first transmission operation;

creating a second packet string including said first data packet, and also a second data packet having a second segment of information identified by a second identification code, and placing the second data packet in a second field of the second packet string;

transmitting said second packet string in a second transmission operation; and checking if the maximum packet field depth was reached during the second transmission and, if so, then for a next subsequent transmission, discarding the first data packet and locating the second data packet in the first field of a next subsequent packet string, and adding a new data packet in the second field of the next subsequent packet string;

continuing to drop an oldest one of the data packets and shift remaining, previously transmitted ones of the data packets by one field position, for each new subsequent transmission, whenever a new data packet is added and a previous one of the new subsequent data transmissions required the maximum packet field depth to be used; and and if the maximum packet field depth was not reached when transmitting the second packet string, then for a next subsequent packet string, placing the first data packet in the first field position, the second data packet in the second field, and a next new data packet in a third field of a new next subsequent packet string, and transmitting the new next subsequent packet string.

2. The method of claim 1, wherein said wide area network comprises the Internet, and said protocol comprises a voice over Internet protocol (VoIP).

3. The method of claim 1, further comprising forming said first data packet to include a cyclic redundancy check (CRC) for information forming said first segment of information and said first ID code.

4. The method of claim 3, further comprising forming said second data packet to include a CRC for information forming said second segment of information and said second ID code.

5. The method of claim 1, wherein the next new data packet includes:
a third segment of information; and
a third ID code.

6. The method of claim 5, further comprising forming the next new data packet to include a third CRC for information forming said third segment of information and said third ID code.

7. The method of claim 5, further comprising forming a another new data packet placed in a fourth field of another new packet string, the another new packet string using information from said first data packet, said second data packet and said next new data packet, and wherein said another new data packet includes:
a fourth segment of information;
a fourth ID code.

8. The method of claim 7, further comprising including a CRC with said another new data packet for said fourth segment of information and said fourth ID code.

9. The method of claim 1, wherein said first segment of information comprises audio information.

10. The method of claim 1, wherein said first segment of information comprises at least one of:
video information;
chat information;
alarm information; and
alert information.

11. A method for communicating real time information using voice over Internet protocol (VoIP) information, comprising:
defining a maximum packet field depth that limits a number of data packets that may be transmitted as a single packet string of data packets in a single data transmission operation;
creating a first data packet having a first segment of information, and a first identification (ID) code, and placing the first data packet in a first field of a first packet string;
transmitting said first packet string in a first transmission operation;
creating a second packet string including said first data packet, and also a second data packet having a second segment of information identified by a second identification code, and placing the second data packet in a second field of the second packet string;
transmitting said second packet string in a second transmission operation; and checking if the maximum packet field depth was reached during the second transmission and, if so, then for a next subsequent transmission, discarding the first data packet and locating the second data packet in the first field of a next subsequent packet string, and adding a new data packet in the second field of the next subsequent packet string;

continuing to drop an oldest one of the data packets and shift remaining, previously transmitted ones of the data packets by one field position, for each new subsequent transmission, whenever a new data packet is added and a previous one of the new subsequent data transmissions required the maximum packet field depth to be used; and if the maximum packet field depth was not reached when transmitting the second packet string, then for a next subsequent packet string, placing the first data packet in the first field position, the second data packet in the second field, and a next new data packet in a third field of a new next subsequent packet string, and transmitting the new next subsequent packet string.

12. The method of claim 11, wherein said first segment of real time information comprises at least one of:
a real time audio recording segment;
video information;
chat information;
alarm information; and
alert information.

13. The method of claim 11, wherein said first segment of real time information comprises a real time video recording segment.

14. A data transmission system comprising:
a controller for implementing a communication protocol over a wide area network to transmit packet strings over said wide area network, wherein the packet strings each include a predetermined maximum packet field depth that limits a number of segments of information that may be transmitted as part of a single transmission operation;
a transmitter responsive to the controller and adapted to transmit said packet strings formatted by said controller; and
the controller configured to:
generate a first data packet having a first segment of information, and a first identification (ID) code, and to place the first data packet in a first field of a first packet string;
transmit said first packet string in a first transmission operation;
create a second packet string including first data packet, and also a second data packet having a second segment of information identified by a second identification code, and to place the second data packet in a second field of the second packet string;
transmit said second packet string in a second transmission operation; and
check if the maximum packet field depth was reached during the second transmission and, if so, then for a next subsequent transmission, to discard the first data packet and locate the second data packet in the first field of a next subsequent packet string, and to add a new data packet in the second field of the next subsequent packet string;
continue to drop an oldest one of the data packets and shift remaining, previously transmitted ones of the data packets by one field position, for each new subsequent transmission, whenever a new data packet is added and a previous one of the new subsequent data transmissions required the maximum packet field depth to be used; and if the maximum packet field depth was not reached when transmitting the second packet string, then for a next subsequent packet string, placing the first data packet in the first field position, the second data packet in the second field, and a next new data packet in a third field of a new next subsequent packet string, and transmitting the new next subsequent packet string.

15. The system of claim 14, wherein said first data packet further comprises a first cyclic redundancy check (CRC) for information making up said first data packet, and wherein said second data packet includes a second CRC for information forming said second segment of real time information.

16. The system of claim 14, wherein said wide area network comprises the Internet, and wherein said communication protocol comprises a voice over Internet protocol (VoIP).

* * * * *